United States Patent Office 2,945,062
Patented July 12, 1960

2,945,062
N-LOWER-ALKYL-N-NITROSO-3,5-DINITRO-o-TOLUAMIDES

Charles W. Hinman, Midland, Mich., assignor to The Dow Chemical Company, Midland, Mich., a corporation of Delaware No Drawing. Filed Aug. 4, 1958, Ser. No. 753,106

6 Claims. (Cl. 260—558)

This invention is directed to N-lower-alkyl-N-nitroso-3,5-dinitro-o-toluamides corresponding to the formula

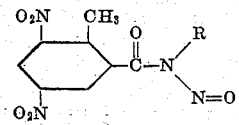

wherein R represents a lower alkyl radical. The term lower-alkyl is employed in the present specification and claims to refer to the alkyl radicals containing from 1 to 6 carbon atoms, inclusive. The new N-lower-alkyl-N-nitroso-3,5-dinitro-o-toluamides are crystalline solids which are somewhat soluble in many organic solvents and of low solubility in water. They have been found to be useful as parasiticides and are adapted to be employed as active toxic constituents of compositions for the control of a number of insect, fungal, Helminth and protozoan organisms such as aphids, Mexican bean beetles, *Alternaria solani*, *Eimeria tenella*, and *Eimeria necatrix*.

The novel N-lower-alkyl-N-nitroso-3,5-dinitro-o-toluamides may be prepared by causing a reaction between nitrous acid and an N-lower-alkyl-3,5-dinitrotoluamide corresponding to the following formula

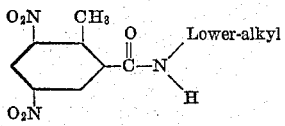

In such a method, the nitrous acid is generated in situ in the reaction mixture from the reaction of sodium nitrite and a lower aliphatic acid such as acetic acid. The reaction conveniently may be carried out in a reaction medium such as a lower aliphatic acid or its anhydride, or a mixture thereof. The reaction takes place smoothly at the temperature range of from —10° to 20° C. with the production of the desired product. Good results are obtained when one molecular proportion of the N-lower-alkyl-3,5-dinitrotoluamide is employed with one molecular proportion of nitrous acid or with one molecular proportion of each of sodium nitrite and the lower aliphatic acid as the precursors of the nitrous acid.

In carrying out the reaction, the N-lower-alkyl-3,5-dinitro-o-toluamide is dispersed in the lower aliphatic acid or a mixture of the lower aliphatic acid and its anhydride, and the sodium nitrite added slowly portionwise thereto with stirring. The addition is usually carried out over a period of from 2 to 5 hours and at a temperature of from —10° to 20° C. During the course of the reaction, the desired N-lower-alkyl-N-nitroso-3,5-dinitro-o-toluamide product precipitates in the mixture as a solid material. Upon completion of the reaction, the reaction mixture may be diluted with ice and water to precipitate further product, which may be separated by filtration. The separated product may be further purified by conventional methods such as washing with dilute aqueous sodium carbonate and recrystallizing from various organic solvents.

The following examples merely illustrate the invention and are not to be construed as limiting.

*Example 1.—N-methyl-N-nitroso-3,5-dinitro-o-toluamide*

Sodium nitrite (15 grams; 0.22 mole) was added slowly portionwise with stirring to 3.7 grams (0.015 mole) of N-methyl-3,5-dinitro-o-toluamide dispersed in 20.1 grams (0.35 mole) of acetic acid and 100 milliliters of acetic anhydride. The addition was carried out over a period of 5 hours and at a temperature of about 0° C. Stirring was thereafter continued, and the reaction mixture maintained at a temperature of 0° C. for 16 hours. During the reaction, an N-ethyl-N-nitroso-3,5-dinitro-o-toluamide product precipitated in the mixture as a solid. Upon the completion of the reaction, the reaction mixture was diluted with ice and water to precipitate further product, and the product thereafter separated by filtration. The separated product was recrystallized from ethanol and found to melt at 131° C. and to have carbon and nitrogen contents of 40.8 and 20.44 percent, respectively, as compared with theoretical contents of 40.34 and 20.44 percent.

*Example 2.—N-ethyl-N-nitroso-3,5-dinitro-o-toluamide*

Sodium nitrite (22.5 grams; 0.33 mole) was added portionwise with stirring to 3.8 grams (0.015 mole) of N-ethyl-3,5-dinitro-o-toluamide dispersed in 21 grams of acetic acid and 100 milliliters of acetic anhydride. The addition was carried out over a period of 5 hours and at a temperature of 0° C. Following the addition, the reaction mixture was maintained at a temperature of 0° C. for 16 hours with stirring, and the temperature thereafter allowed to rise to about 15° C. over a period of 30 minutes. The reaction mixture was thereafter diluted with a mixture of ice and water, the diluted mixture extracted with diethyl ether and the ether extract successively washed with 5 percent aqueous sodium carbonate and water. The solvent was then removed from the washed extract by evaporation to obtain an N-ethyl-N-nitroso-3,5-dinitro-o-toluamide product as a crystalline solid. This product was recrystallized from ethanol and found to melt at 106° C., and to have carbon and nitrogen contents of 42.71 and 19.67 percent respectively as compared with theoretical contents of 42.6 and 19.86 percent.

*Example 3.—N-n-propyl-N-nitroso-3,5-dinitro-o-toluamide*

Sodium nitrite (15 grams; 0.22 mole) was added slowly portionwise to 3.9 grams (0.015 mole) of N-n-propyl-3,5-dinitro-o-toluamide dispersed in 20 grams of acetic acid and 100 milliliters of acetic anhydride. Stirring was thereafter continued and the reaction mixture maintained at a temperature of 0° C. for 16 hours. Upon completion of the reaction, the reaction mixture was diluted with a mixture of ice and water and thereafter filtered to obtain an N-n-propyl-N-nitroso-3,5-dinitro-o-toluamide product as a crystalline solid. This product was recrystallized from a mixture of isopropyl alcohol and water and found to melt at 94–94.5° C., and to have a nitrogen content of 18.59 percent as compared with a theoretical content of 18.99 percent.

*Example 4.—N-isobutyl-N-nitroso-3,5-dinitro-o-toluamide*

Sodium nitrite (10 grams; 0.145 mole) was added slowly portionwise with stirring to 3.7 grams (0.01 mole) of N-isobutyl-3,5-dinitro-o-toluamide. The addition was carried out over a period of 3½ hours and at a temperature of 0° C. Stirring was thereafter continued for an additional 1½ hours and the reaction mixture thereafter set aside for 20 hours at 0° C. Following this period, the reaction mixture was filtered to separate an N-isobutyl-N-nitroso-3,5-dinitro-o-toluamide product as a crystalline solid. N-isobutyl-N-nitroso-3,5-dinitro-o-toluamide has a molecular weight of 281.

*Example 5.—N-n-hexyl-N-nitroso-3,5-dinitro-o-toluamide*

Sodium nitrite (10 grams) was added slowly portionwise with stirring to 3.9 grams (0.01 mole) of N-n-hexyl-3,5-dinitro-o-toluamide dispersed in 20 grams of acetic acid and 100 milliliters of acetic anhydride. The addition was carried out over a period of 3½ hours and at a temperature of 0° C. Stirring was thereafter continued for an additional 1½ hours at 0° C., and the reaction mixture thereafter maintained at this same temperature for 20 hours. Following this period, the reaction mixture was filtered to separate an N-n-hexyl-N-nitroso-3,5-dinitro-o-toluamide product as a crystalline solid. This product was recrystallized from isopropyl alcohol and found to melt at 49°–50° C.

The compounds of the present invention have been found to be useful as parasiticides and as anthelmintics for the control of gastro-intestinal parasites in animals. In such uses, the unmodified compounds may be employed or a composition containing the compounds in admixture with an edible liquid, or a finely divided solid such as alcohol, syrups, edible oils, grain rations, feed supplements, feed concentrates or animal feeds. The products may likewise be employed as constituents of aqueous dispersions or oil-in-water emulsions with or without the addition of surface active dispersing agents. In representative operations, the feeding as a sole ration to chickens of a commercial poultry mash containing 0.01 percent by weight of N-ethyl-N-nitroso-3,5-dinitro-o-toluamide gives substantially complete controls of *Eimeria tenella* and cecal coccidiosis in the birds.

The N-alkyl-3,5-dinitro-o-toluamides employed as starting materials in accordance with the teachings of the present invention are crystalline solids which are somewhat soluble in many organic solvents and of low solubility in water. They may be prepared by the reaction of 3,5-dinitro-o-toluic acid with thionyl chloride ($SOCl_2$) or phosphorus pentachloride to produce the corresponding acid chlorides. The acid chlorides are then reacted with at least two moles of a suitable alkyl amine per mole of acid chloride to obtain the desired N-lower-alkyl-3,5-dinitro-o-toluamide compound.

I claim:
1. N-lower-alkyl-N-nitroso-3,5-dinitro-o-toluamide.
2. N-methyl-N-nitroso-3,5-dinitro-o-toluamide.
3. N-ethyl-N-nitroso-3,5-dinitro-o-toluamide.
4. N-n-propyl-N-nitroso-3,5-dinitro-o-toluamide.
5. N-isobutyl-N-nitroso-3,5-dinitro-o-toluamide.
6. N-n-hexyl-N-nitroso-3,5-dinitro-o-toluamide.

References Cited in the file of this patent

White: J.A.C.S., vol. 77 (1955), pp. 6008–10.